(12) United States Patent
Møller (10) Patent No.: US 11,580,844 B2
(45) Date of Patent: Feb. 14, 2023

(54) SYSTEM FOR MANAGING PERSONAL SAFETY

(71) Applicant: RESCUE CONSULT AS, Bodø (NO)

(72) Inventor: Jan Ottar Møller, Bodo (NO)

(73) Assignee: RESCUE CONSULT AS, Bodø (NO)

( * ) Notice: Subject to any disclaimer, the term of this patent is extended or adjusted under 35 U.S.C. 154(b) by 0 days.

(21) Appl. No.: 17/263,931

(22) PCT Filed: Jul. 25, 2019

(86) PCT No.: PCT/NO2019/050158
§ 371 (c)(1),
(2) Date: Jan. 28, 2021

(87) PCT Pub. No.: WO2020/027663
PCT Pub. Date: Feb. 6, 2020

(65) Prior Publication Data
US 2021/0350690 A1   Nov. 11, 2021

(30) Foreign Application Priority Data
Aug. 1, 2018  (NO) .................................. 20181038

(51) Int. Cl.
*G08B 5/14* (2006.01)
*H04W 4/80* (2018.01)
(Continued)

(52) U.S. Cl.
CPC ......... *G08B 25/016* (2013.01); *G08B 25/008* (2013.01); *G08B 25/14* (2013.01);
(Continued)

(58) Field of Classification Search
CPC .................................................. G08B 25/016
See application file for complete search history.

(56) References Cited

U.S. PATENT DOCUMENTS 7,026,928 B1 * 4/2006 Lane ...................... G08B 21/02
340/426.1
9,426,638 B1 * 8/2016 Johnson ............... G08B 25/016
(Continued)

OTHER PUBLICATIONS

International Search Report issued in PCT/NO2019/050158, dated Sep. 10, 2019, pp. 1-3.
(Continued)

*Primary Examiner* — Mohamed Barakat
*Assistant Examiner* — Pameshanand Mahase
(74) *Attorney, Agent, or Firm* — Jeffrey S. Melcher; Melcher Patent Law PLLC (57) ABSTRACT

A personal safety management system (100) comprising at least one portable communication device (200) communicatively connected to a wireless communication network (400); and a central computing device (500) communicatively connected to the wireless communication network (400). The at least one portable communication device (200) is configured to enable the activation of an alarm condition by a user (700) and transmitting data on the activation of the alarm condition to the central computing device (500). The central computing device (500) is configured to receive the data on the activation of the alarm condition from the at least one portable communication device (200). Furthermore, the central computing device (500) is configured to activate the alarm condition at the end of a predetermined time delay after the activation of a first operating element (210) on the communication device (200). In one embodiment, the portable communication device comprises a second operating element (220) and is configured to input, from the second operating element (220), extension data indicating the extension of the predetermined delay, and to transmit the extension data to the central computing device (500); and the central computing device (500) is configured to extend the predetermined delay based on the extension data.

11 Claims, 8 Drawing Sheets

(51) Int. Cl.
    *H04W 4/90*     (2018.01)
    *H04W 4/02*     (2018.01)
    *G08B 21/08*    (2006.01)
    *G08B 25/01*    (2006.01)
    *G08B 25/00*    (2006.01)
    *G08B 25/14*    (2006.01)

(52) U.S. Cl.
    CPC .............. *H04W 4/025* (2013.01); *H04W 4/80* (2018.02); *H04W 4/90* (2018.02)

(56) References Cited

U.S. PATENT DOCUMENTS

2008/0303657 A1* 12/2008 Yuk .......................... G08B 6/00
                                                            340/540
2009/0096602 A1*  4/2009 Reyes .................. G08B 25/016
                                                            340/506
2019/0088101 A1*  3/2019 Tunnell .............. G08B 21/0216

OTHER PUBLICATIONS

Written Opinion issued in PCT/NO2019/050158, dated Sep. 10, 2019, pp. 1-5.

* cited by examiner

SYSTEM FOR MANAGING PERSONAL SAFETY

TECHNICAL FIELD

The present invention relates to a system for managing personal safety.

More particularly, the invention relates to a personal safety management system of such a nature that includes at least one portable communication device communicatively connected to a wireless communication network; a central computing device communicatively connected to the wireless communication network; wherein the at least one portable communication device is configured to enable activation of an alarm condition by a user, and to transmit data on the activation of the alarm condition to the central computing device; and wherein the central computing device is configured to receive the data regarding the activation of the alarm condition from the at least one portable communication device.

BACKGROUND ART

There is a general need for systems for managing personal safety.

US-2008/0189162 A1 relates to a web-based and telephone-based emergency management system. The system operates as an intuitive command and control application consisting of a number of integrated software-driven, functional processes, communications devices and services, and a corporate database of key information needed in an emergency, interactively serving an organisation's first respondents, administrators and agents, emergency management teams and a number of internal and external key stakeholders.

US-2007/0216535 A1 and US-2006/0109113 A1 relate to various data/telecommunication-based warning systems to alert residents within a geographical area during emergency situations.

US-2008/0284587 relates to a personal safety management system, wherein a mobile communication device is adapted to initiate and send an alarm notification signal to a network in an emergency.

It is a general object of the invention to provide an improved personal safety management system of the kind mentioned initially.

SUMMARY

The scope of the invention is set forth in the independent claim 1 below. Preferred embodiments are set forth in the dependent claims.

According to the invention, the above-mentioned general purpose and/or other objects and technical effects are achieved in that the central computing device is configured to activate the alarm condition at the expiration of a predetermined time delay after the activation of a first operating element on the communication device.

In this way, among other things, increased safety for the user is achieved. The time delay will help the alarm condition not attract unnecessary attention from a potentially threatening party, and the fact that the delay is handled in the central computing device and not in the portable communication device means that the alarm condition will be activated after the predetermined time delay without the possibility of manipulation or deactivation of the potentially threatening party.

Further advantageous technical effects are obtained by the features set forth in the preferred embodiments defined in the dependent claims 2-12.

BRIEF DESCRIPTION OF THE DRAWINGS

In the following, the invention will be illustrated by way of non-limiting examples, and with reference to the drawings.

DETAILED DESCRIPTION OF EMBODIMENTS

Figure 1:
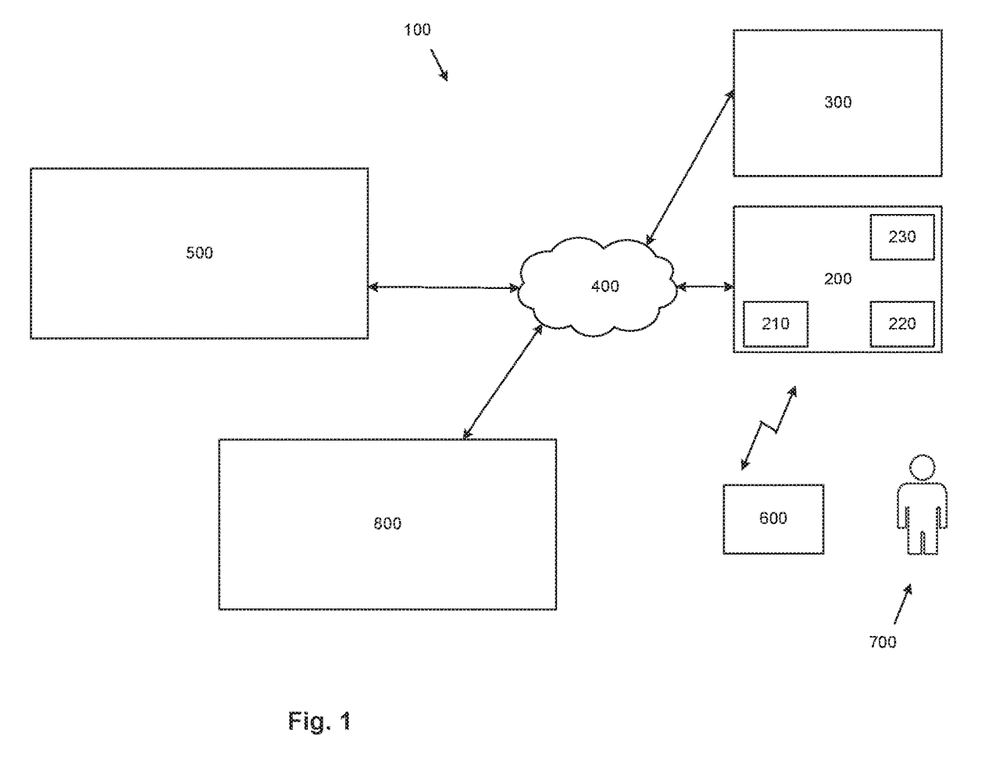
FIG. 1 is a schematic block diagram showing a personal safety management system according to the invention.

FIG. 1 is a schematic block diagram showing an example of a personal safety management system 100 in accordance with the invention.

The system 100 includes a portable communication device 200 communicatively connected to a wireless communication network 400. In embodiments, the system comprises a plurality of such, equivalent or similar, portable communication devices 200. In typical applications, the portable communication device 200 is associated with and operated by a personal user 700. When the system includes a plurality of portable communication devices 200, they are usually associated with and operated by respective personal users 700.

The system 100 further comprises a central computing device 500, which is also communicatively connected to the wireless communication network 400.

The portable communication device 200 is configured to enable activation of an alarm condition by a user 700, and to transmit the alarm condition data to the central computing device 500 via the wireless communication network 400.

The wireless communication network 400 is arranged to enable data communication between data communication devices, computing devices, etc., including mobile phones, personal computers, servers, etc. The communication network 400 may be a general communication network consisting of multiple sub-networks, interconnected with network elements such as gateways, bridges, switches, routers, repeaters, etc. The sub-networks may include, for example, mobile networks (5G, 4G, 3G, GPRS, UMTS, EDGE, GSM, etc.), and local wireless networks (WLAN, Wi-Fi, etc.) Parts of the communication network 400 may be non-wireless, communication between some elements of the network 400 may be via optical connection, coaxial cable, wire pair, etc.

For example, the portable communication device 200 may be a smartphone operating on a regular operating system such as Android, Windows Mobile, iOS or the like. The portable communication device 200 may be provided with processing equipment, memory, display screen, controls (including, for example, in the form of touch screen elements), radio communication equipment for communication in mobile communication networks (5G, 4G, 3G, etc.), additional radio communications equipment for digital local communication (including Wi-Fi, Bluetooth), location determination equipment, for example in the form of GPS navigation receiver, as well as battery and associated circuits for power supply The portable communication device 200 may further comprise camera (s), audio recorder (s)/player (s), and various applications (apps) in the form of software which may be stored in the memory of the communication device and executed on the processing unit of the communication device. Below, the portable communication device 200 is provided with an application, or set of applications or application modules, which provide functions for managing personal safety, including alarm functionality, as described herein.

Alternatively, the portable communication device 200 may be a portable computer, a tablet, or the like, provided with hardware and software features as described herein, or similarly. The portable communication device 200 is also configured to execute an application program that provides personal safety management functionality as described herein.

Similarly, the central computing device 500 shown in FIG. 1, configured to receive the data on the alarm condition from the at least one portable communication device 200.

The central computing device 500 may be a general-purpose computer adapted to communicate on the network 400, provided with data storage, memory, a general operating system, server functionality, and, in addition, special programs or program modules which implement personal safety management functionality as described herein.

The portable communication device 200 comprises a first operating element 210. The first operating element 210 may function to activate a delayed alarm in the system 100.

The first operating element may, for example, be an operating element which is displayed on a touch screen of the communication device 200. Alternatively, the first operating element may be a more traditional operating element in the form of a push-button or the like. The central computing device 500 is configured to activate the alarm condition at the end of a predetermined time delay after the activation of a first operating element 210 on the communication device 200. For this purpose, the portable communication device 200 is configured to read the first operating element 210 and to communicate with the central computing device data indicating that the first operating element is activated by the user 700.

Preferably, data indicating that the first operating element is activated is communicated immediately after the first operating element 210 is activated. The further delayed alarm is then handled by the central computing device 500. Among other things, this has the advantage effect that the alarm condition in the central computing device will be activated independently of subsequent arbitrary operation of the portable communication device 200. For example, the alarm state will be activated after the predetermined time delay even if the portable communication device 200 is turned off or otherwise lost its ability to communicate, after the first operating element 210 is activated. This contributes to increased safety for the user, as outsiders will not be able to reset the delayed alarm after the user has activated the first operating element 210.

In an exemplary embodiment, the portable communication device further comprises a second operating element 220. The second operating element has the function of causing, by operation, the predetermined delay to be extended. In this exemplary embodiment, the portable communication device 200 is configured to read, from the second control element 220, extension data indicating the extension of the predetermined delay. The portable communication device is further configured to transmit the extension data to the central computing device 500, over the network 400. Further, in this embodiment, the central computing device 500 is configured to extend the predetermined delay based on the extension data.

In one exemplary embodiment, the portable communication device 200 comprises a third operating element 230 and/or a remote enable device 600 which is in wireless communication with the portable communication device 200. The third operating element 230 and possibly the remote activation device function to cause an immediate activation of the alarm condition in the central station. computing device 500. In this exemplary embodiment, the portable communication device is configured to transmit to the central communication device an instruction for immediate activation of the alarm condition in response to operation of the third operating element 230 and/or the activation of the remote activation device 600. In addition, in this embodiment, the central computing device 500 configured to cause immediate activation of the alarm condition in response to receipt of the instruction.

In a further embodiment, the central computing device 500 is configured to enable deactivation of an activated alarm condition by receiving alarm deactivation data from the portable communication device 200, to verify the alarm deactivation data. Upon successful verification of the alarm deactivation data, the portable communication device is configured to disable the alarm condition. Such verification can imply authentication of the user 700, for example by reading a password/personal code on additional control elements, or alternatively by reading in biometric data, on the portable communication device, in combination with a corresponding authentication function implemented in the central computing device 500.

The duration of the predetermined time delay may be pre-set by the user 700 by means of controls on the portable communication device 200, and/or data representing the duration may be communicated from the central computing device 500. For example, the time delay may be set within a range of 5 seconds to 120 seconds. seconds, or between 10 seconds and 60 seconds, but many options are possible.

In any of the above embodiments, the portable communication device 200 may advantageously be configured to provide location data representing the geographic location of the communication device; and transmitting the location data, via the wireless communication network 400, to the central computing device 500. Further, in such an embodiment, the central computing device 500 is advantageously configured to receive the location data from the at least one portable communication device 200.

In the above embodiment, the central computing device 500 may advantageously be further configured to maintain data representing a sequence of predetermined location data, and to maintain the data representing the sequence of predetermined location data with actual location data received from the portable communication device 200.

In any of the above embodiments, in addition to the first 200 portable communication device, the system may comprise another portable communication device 300. The second portable communication device 300 is also communicatively connected to the wireless communication network 400. In such an embodiment, the central computing device may advantageously be configured to, in the case of an alarm condition enabled by the first 200 portable communication device, to send an alert regarding the alarm condition to the second portable communication device 300. The second portable communication device 300 will typically be associated with and operated by another user than the user 700.

Further, in the above-mentioned embodiment of the system, the central computing device 500 may further be configured to select the second portable communication device 300 among a plurality of portable communication devices, this selection being based on various location data associated with and provided by the majority of portable communication devices. For example, this selection may involve selecting, as the second portable communication device 300, the portable communication device having the shortest distance location data from a particular location. This particular location may, for example, be the location of the first portable communication device 200.

The portable communication devices 200, 300 may, for example, be configured to provide the location data based on GPS data. Alternatively, the portable communication devices 200, 300 may, for example, be configured to provide the location data based on data received from a local radio transmitter or beacon. Such a local radio transmitter may, for example, be adapted for Bluetooth communication. Such local radio transmitters may, for example, be placed in different rooms in a building, and may therefore provide more detailed location information than would otherwise be achieved by GPS location data. This allows for improved features of the system on stationary facilities, such as inside a building, and especially in a multi-storey building.

In any of the above embodiments, the central computing device 500 may be configured to perform a set of actions depending on the alarm condition of the at least one portable communication device 200. Such actions may be included in a set comprising the following exemplary actions:

logging of data representing the alarm state,
notification of a portable communication device, and
notification by an external body.

In any of the above embodiments, the system 100 may further comprise a further computing device 800 which is also communicatively connected to the wireless communication network 400. In such an embodiment, the additional computing device 800 may be configured to manage data relating to various portable communication devices (including the portable communication device 200) alarm condition, location data, sequences of predetermined location data and event logging.

Further, in any of the above embodiments, the central computing device 500 may be configured to establish message communication between portable communication devices included in the system. Alternatively, or additionally, the central computing device 500 may be configured to establish message communication between one or more portable communication devices and the central computing device 500.

Figure 2:
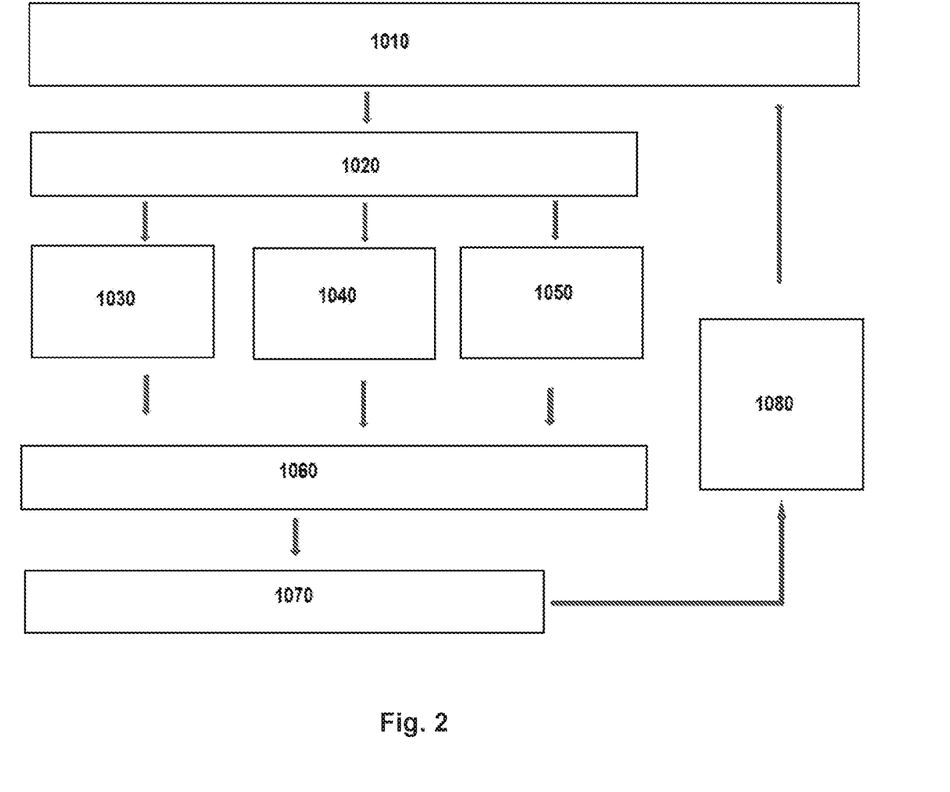
FIG. 2 is a schematic flow chart illustrating aspects of activating an alarm condition.

FIG. 2 is a schematic flow chart illustrating aspects of activating an alarm condition.

At 1010, a state is indicated where the user 700 has activated a program which enables the activation of an alarm condition by various modes of activation.

At 1020, it is stated that user 700 can activate an alarm condition in three different ways. The various modes of activation allow the user 700 to initiate notification in a sophisticated manner, which upon proper execution will not attract unnecessary attention from an potentially threatening third party. It will be appreciated that the number of different modes of activation may be different from three, including only one or two of the modes shown, optionally in combination with additional modes of activation.

At 1030, it is stated that the alarm condition can be activated by operating a regular operating element, referred to as the third operating element, 230, on the portable communication device 200. This may include, for example, a regular, visible control element on a touch screen of the communication device 200.

At 1040, it is indicated that the alarm condition can be activated by operating an invisible (not shown) control element on the touch screen of the communication device 200. This may include touching a discrete virtual button on the screen, or via a slider that is not displayed on the screen. Such a function makes it difficult for the alarm condition to be activated by unauthorized persons.

At 1050, it is stated that the alarm condition can be activated by the remote enable device 600, which wirelessly connected to the portable communication device 200, for example by Bluetooth communication or other type of card-hold wireless communication, such as Wi-Fi-based radio communication, ZigBee, BLE, WiMAX, NFC, or optical communication, e.g. infrared. The remote activation device may be provided with an operating element which activates the alarm condition.

At 1060, the alarm state is indicated.

At 1070, it is stated that the central computing device 500 receives notification of activated alarm condition and acknowledges that alerting of activated alarm condition is received, by sending acknowledgment message to the portable communication device 200.

At 1080, it is indicated that the application on the portable communication device 200 notifies the user 700 that the acknowledgment of the activated alarm condition is received from the central computing device 500.

Figure 3:
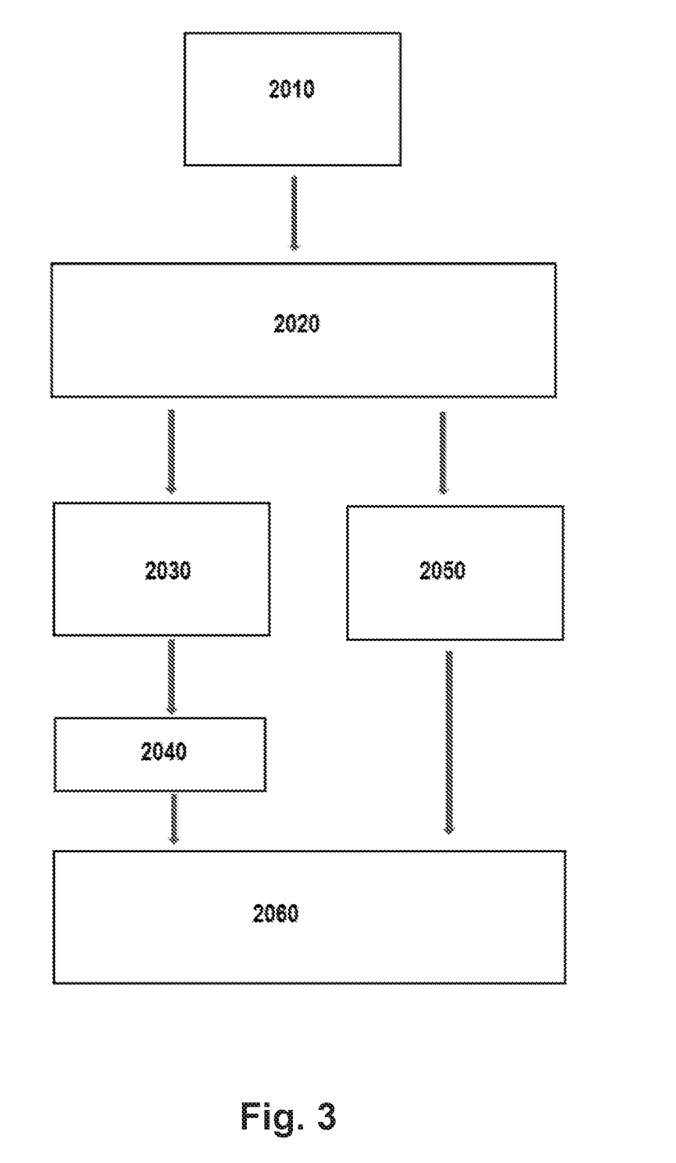
FIG. 3 is a schematic flow chart illustrating aspects of tuning an alarm condition.

FIG. 3 is a schematic flow chart illustrating aspects of deactivating an alarm condition.

Deactivation of the alarm mode allows the user 700 to cancel or deactivate an activated alarm condition. This provides a beneficial effect because the situation of the user 700 may have changed after the alarm condition was activated or because the alarm condition was accidentally or mistakenly activated. This increases ease of use and assures the user 700 of undesirable consequences of performing an action that can trigger unnecessary measures.

By 2010, it is stated that alarm condition is activated.

By 2020, it is stated that a suspended alarm is desirable, e.g. selected by the user 700 when operating the application in the portable communication device 200.

At 2030, it is stated that the alarm condition is to be cancelled by reading, in the application in the portable communication device 200, a personal code known to the user 700. This ensures that unauthorized persons can reset an alarm condition that is activated.

By 2040, the user is requested to confirm the cancellation.

Figure 4:
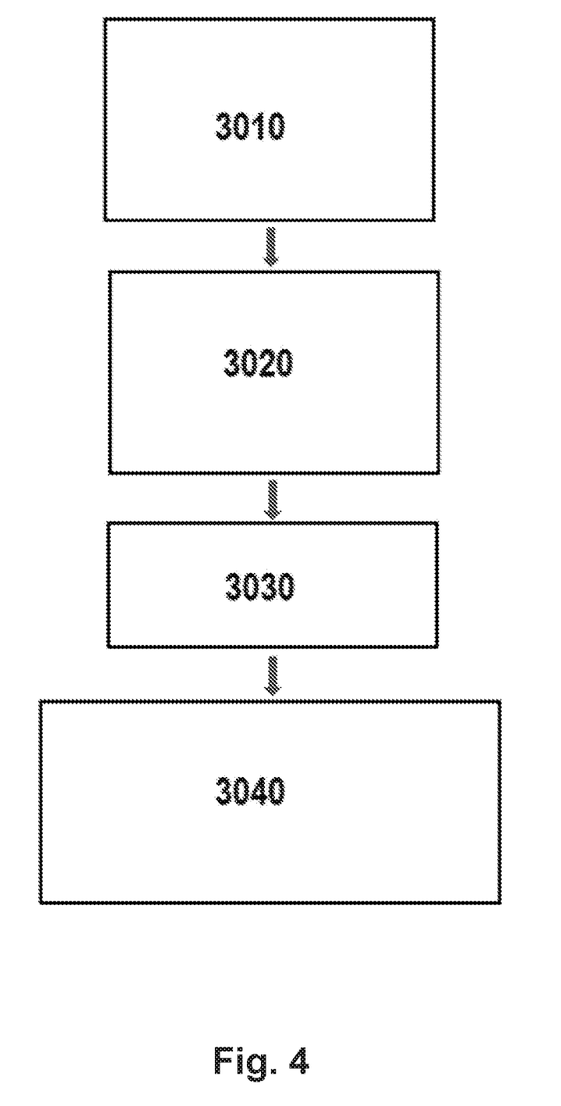
FIG. 4 is a schematic flow chart illustrating aspects of delayed alarm.

FIG. 4 is a schematic flow chart illustrating aspects of delayed alarm.

At 3010, the delayed alarm function is indicated. This means that the portable communication device 200 is configured to cause the central computing device to activate an alarm condition at the end of a predetermined time delay after the activation of the control element 210, as previously described.

At 3020, data relating to the function is entered with a delayed alarm. These data can include data representing the duration of the predetermined time delay.

At 3030, the operation of the function is confirmed with delayed alarm.

When the delayed alarm function is initiated, the central computing device 500 is configured to activate the alarm condition at the end of a predetermined time delay after the activation of the control element 230. The predetermined time delay can be set by the user 700 by means of controls in or on the portable communication device 200, controlled by the application executed in the portable communication device 200 and transmitted to the central computing device 500.

The portable communication device 200 may, by means of the application it executes, be configured to cause the central computing device 500 to extend the predetermined time delay after selection by the user 700. This may also be done by the user's operation of controls in/on the portable communication device 200 and transmitting the corresponding data to the central computing device 500 over the network 400. The portable communication device 200 may further be configured to cause, before the expiration of the predetermined time delay, the central computing device to perform immediate activation of the alarm condition. This is done by the user by direct activation of the operating element 230 and/or the remote activation device. This additional function has the effect that the delay of an alarm can be interrupted by the user 700. Further, the alarm condition can be cancelled, as described above with reference to FIG. 3.

In FIG. 4, at 3040, shows alarm status data, remaining delayed alarm time is displayed, and a selection is shown to allow delayed alarm time extension.

Figure 5:
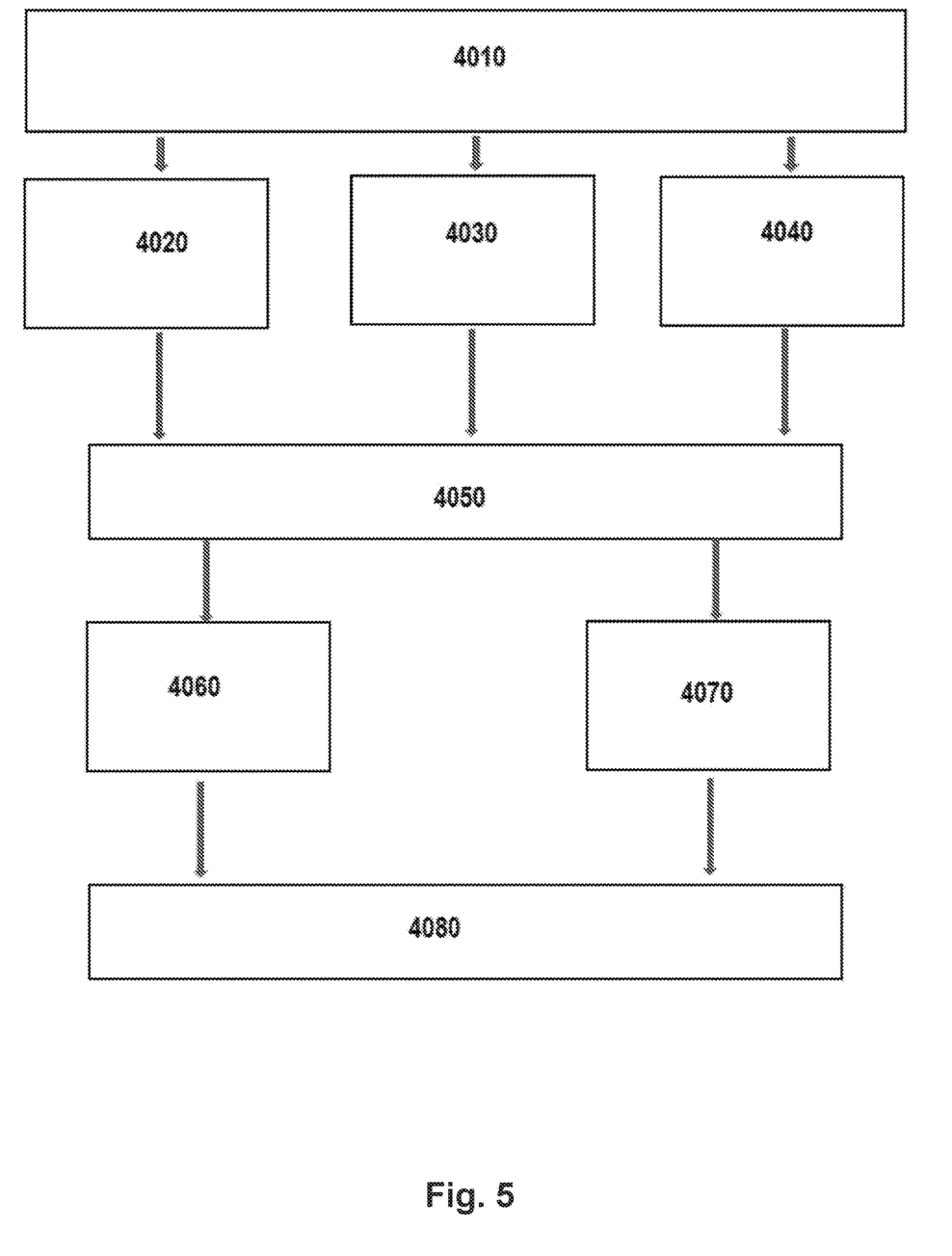
FIG. 5 is a schematic flow chart illustrating aspects of triggered alarm function.

FIG. 5 is a schematic flow chart illustrating aspects of triggered alarm function.

At 4010 it is stated that the alarm function is triggered.

At 4020, 4030 and 4040, three different possible methods of notification are illustrated which can be implemented by triggered alarm function. It will be appreciated that one or two or all three of these may be implemented and that additional means of notification are also possible.

At 4020, it is stated that the alarm function can be notified by means of a message service offered in the mobile communication network, for example SMS.

At 4030, the alarm function is indicated by a message service contained in the communication between the application executed on the portable communication device 200 and the central computing device 500.

At 4040 it is stated that the alarm function can be notified by means of another form of communication, for example as an e-mail message.

At 4050, at the central computing device 500, notification of alarm function is received. This causes activation of a control function at the central computing device 500.

The activation of the control function at the central computing device 500 may further lead to two alternative actions, the first illustrated at 4060, which implies that a control application is activated on the portable communication device 200. The second action, illustrated at 4070, implies that a control function is activated in a web interface on a further computing device 800 communicatively connected in the communication network 400.

At 4080 it is illustrated that the further control of the alarm function can optionally be handled via application or web interface solution.

Figure 6:
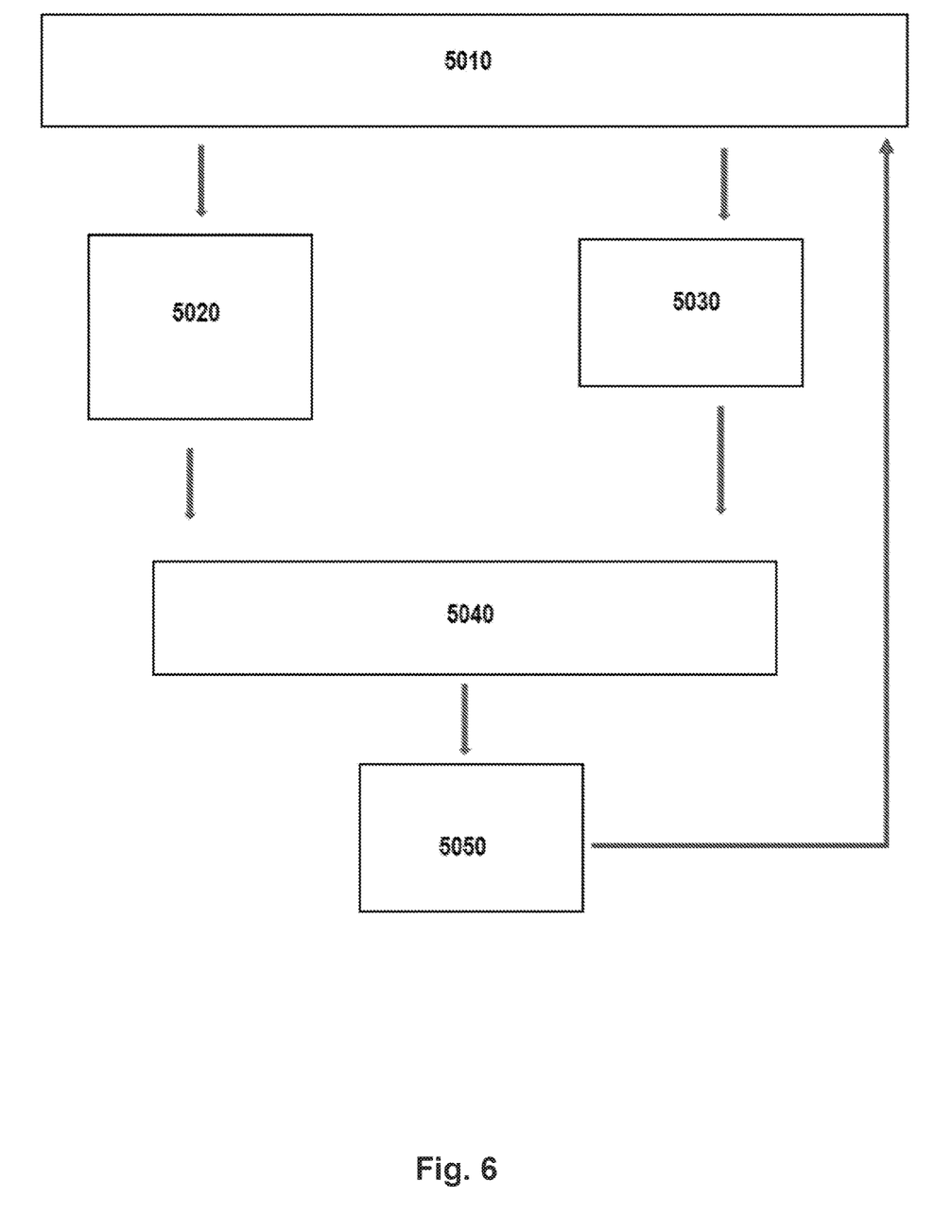
FIG. 6 is a schematic flow chart illustrating aspects of functions during travel.

FIG. 6 is a schematic flow chart illustrating aspects of functions during travel.

The additional features that the system offers a user 700 who is traveling will ensure that the resources that are on the move/assignment can be followed up if there is a risk or danger that the traveller can become part of an unwanted event. This will also provide authorized personnel, the ability to, via application and/or the web-based interface, confirm or deny that the user 700 may be affected by an unwanted event.

At 5010, the user 700 is indicated to have activated a travel function in the application executed on the portable communication device 200.

At 5020, it is stated that the application executed on the portable communication device 200 obtains location data representing the geographical position of the communication device 200, e.g. GPS data. The location data is communicated to the central computing device 500 via the communications network 400. The central computing device 500 is configured to maintain data representing a sequence of predetermined location data, typically a scheduled route for the user 700. The central computing device 500 is further configured to compare the data representing the sequence of predetermined location data with the actual location data received from the portable communication device 200.

At 5030, the user 700, by means of the application executed on the portable communication device, is enabled to activate a check-in function to indicate that a destination has been reached. This may involve a notification of a new location, in the event of deviations from the planned itinerary, or a confirmation that a point on the planned itinerary (the sequence of predetermined location data) has been reached.

At 5040, an update of the location data is performed in the central computing device 500.

At 5050, data from the central computing device 500 is communicated to the portable communication device 200, indicating that location data has been updated and/or checked.

Figure 7:
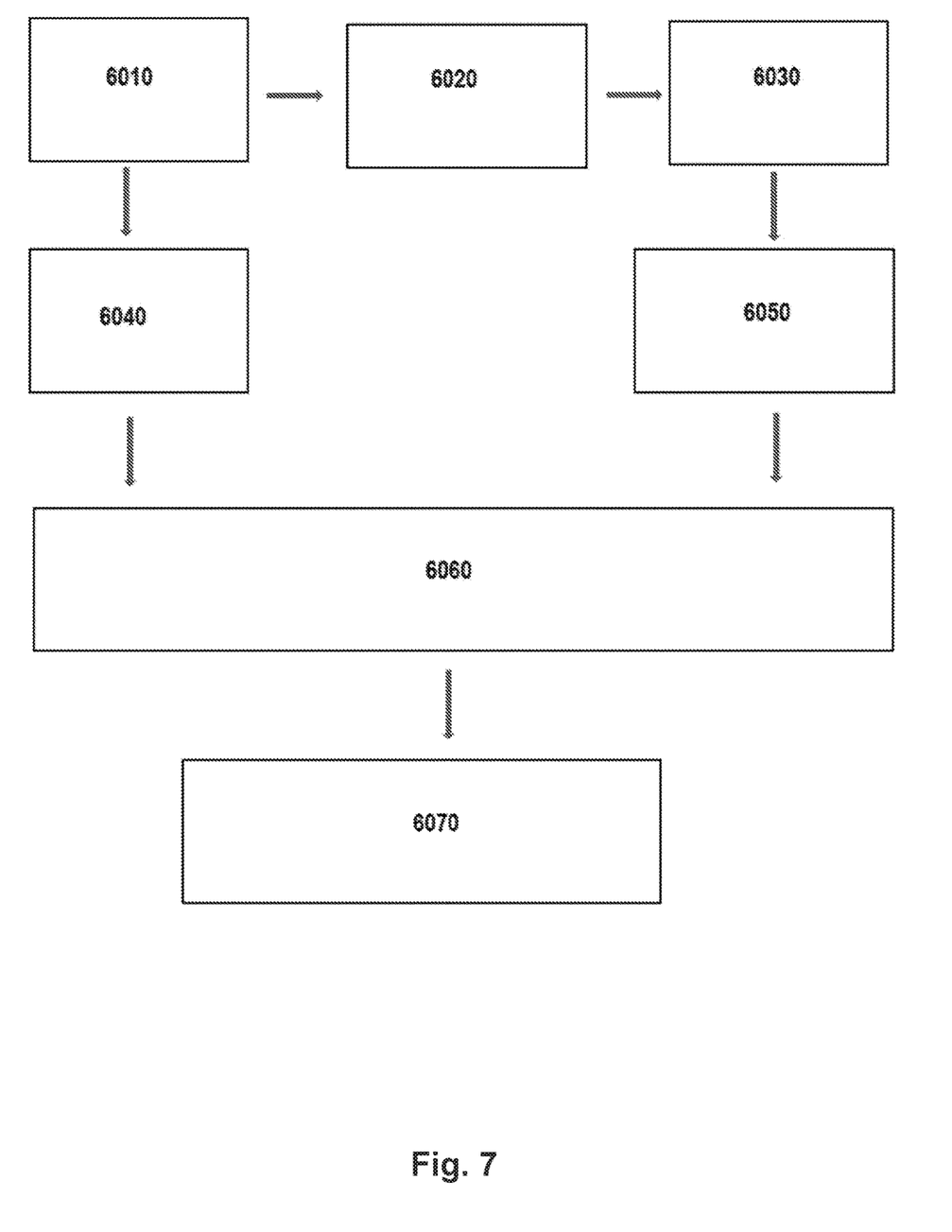
FIG. 7 is a schematic flow chart illustrating aspects of additional functions during travel.

FIG. 7 is a schematic flow chart illustrating aspects of additional functions during travel. FIG. 7 particularly shows functions associated with the web-based tool associated with the system.

At 6010, data identifying or associated with user 700 may be entered.

At 6040, the user 700 is indicated to update location data at the check-in function as discussed under item 5030 of FIG. 6.

Furthermore, at 6020, data on expected/predetermined location, or a sequence of such location data, can be read.

Furthermore, at 6030, it is determined that location tracking is active on the portable communication device 200. Further, at 6050, it is stated that the application on the portable communication device actively and automatically communicates location data to the central computing device 500.

At 6060, it is stated that the location of the user 700 may be followed, for example, on a map, by an operator of the web-based tool.

At 6070, it is stated that the user updates the location data at the check-in function when the destination is reached.

Figure 8:
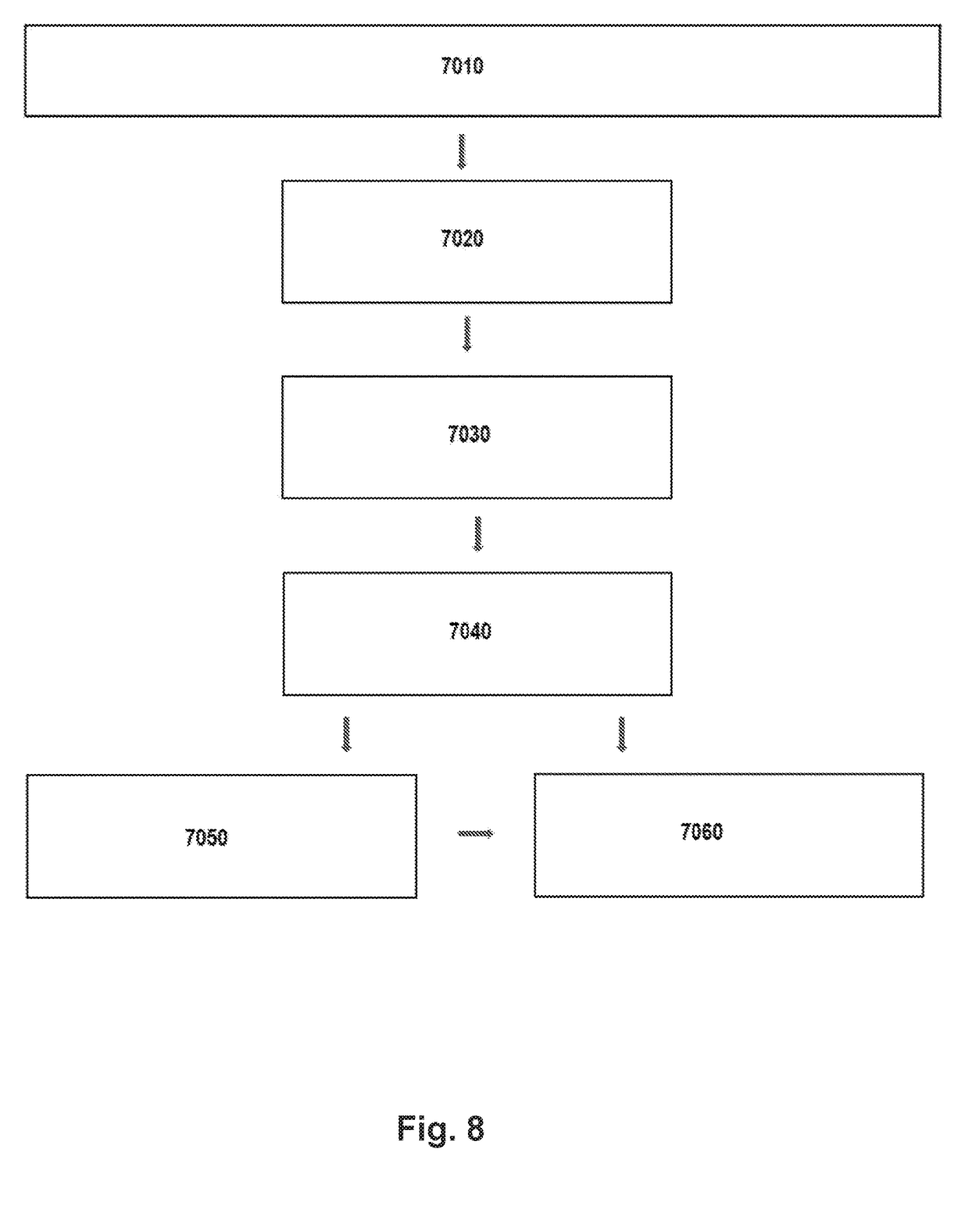
FIG. 8 is a schematic flow chart illustrating aspects of logging functions.

FIG. 8 is a schematic flow chart illustrating aspects of logging functions. Logging functions have a beneficial effect in ensuring traceable and transparent documentation of events/activities using the system.

FIG. 7010 represents an event indicating that logging features are enabled.

At 7020, the event is recorded by storing data related to activity, date, time.

At 7030, it is indicated that additional data associated with the event, such as free text, can be entered.

At 7040, it is stated that the log is locked when the event has ended.

At 7050, it is stated that the logging is terminated.

At 7060, it is stated that the log may, and in a controlled manner, be distributed.

In addition to the elements set forth in the above detailed description, it will be understood by those skilled in the art that the system 100 may include additional elements than those mentioned. Furthermore, it will be understood that many possibilities exist for designing the individual elements described, both hardware and software. Those skilled in the art will therefore appreciate that numerous variations and alternatives are possible within the scope of the invention as set forth in the appended claims and their equivalents.

The system according to the invention provides increased safety for the user, e.g. in that the alarm condition does not attract unnecessary attention from a potentially threatening party, while the activation of the alarm condition cannot be manipulated or deactivated by the potentially threatening party.

Activities generated in the system, either automatically or at the user's service, are generally stored in and handled by the central computing device 500. This has the added advantage that personal data and possibly other sensitive data are kept under control on a central server and that they do not need to be stored locally on the distributed, portable communication devices, at least for a long time. This facilitates the implementation of the system according to privacy principles, such as the EU Regulation 2016/679 (General Data Protection Regulation, GDPR).

The invention claimed is:

1. A personal safety system comprising:
at least one portable communication device communicatively connected to a wireless communication network;
a central computing device communicatively connected to the wireless communication network;
wherein the at least one portable communication device is configured to enable activation of an alarm condition by a user, and transmitting data on the activation of the alarm condition to the central computing device via the wireless communication network;
wherein the central computing device is configured to receive the data regarding the activation of the alarm condition from the at least one portable communication device via the wireless communication network;
wherein the central computing device is configured to activate the alarm condition at the expiration of a predetermined time delay after the activation of a first operating element on the communication device,
wherein the portable communication device comprising a second operating element and configured to input, from the second operating element, extension data indicating the extension of the predetermined delay, and to transmit the extension data to the central computing device; and
wherein the central computing device is configured to extend the predetermined delay based on the extension data.

2. The system according to claim 1, where the central computing device is configured to enable deactivation of an activated alarm condition at receiving alarm deactivation data from the portable communication device;
to verify the alarm deactivation data: and
by successful verification, disabling the alarm condition.

3. The system according to claim 1, wherein the at least one portable communication device is configured for providing location data representing the geographic location of the communication device; and transmitting the location data to the central computing device; and wherein the central computing device is configured to receive the location data from the at least one portable communication device.

4. The system according to claim 3, wherein the central computing device is configured for maintaining data representing a sequence of predetermined location data, and comparing the data representing the sequence of predetermined location data with actual location data received from the at least one portable communication device.

5. The system according to claim 1, wherein the at least one portable communication device comprises a first portable communication device and a second portable communication device communicatively connected to the wireless communication network;
where the central computing device is configured in the case of an alarm condition enabled by the first portable communication device, to transmit to the second portable communication device, a warning regarding the alarm condition.

6. The system according to claim 5, wherein the central computing device is configured to select the second portable communication device among a plurality of the at least one portable communication devices, based on location data associated with and provided by the plurality of the at least one portable communication devices.

7. The system according to claim 5, wherein the first and second portable communication devices are configured to provide the location data on the basis of GPS data and/or data received from a local radio transmitter or Bluetooth device.

8. The system according to claim 1, wherein the central computing device is configured to execute a set of actions depending on the alarm condition, where the measures are part of a set comprising
logging of data representing the alarm state,
notification of the at least one portable communication device, and
notification by an external body.

9. The system according to claim 1, further comprising a further computing device communicatively connected to the wireless communication network, wherein the additional computing device is configured to manage data on portable communication device alarm condition, location data, sequences of predetermined location data, and event logging.

10. The system in accordance with claim 1, wherein the central computing device is configured to establish message communication between a plurality of the at least one portable communication devices, and/or between the plurality of the at least one portable communication devices and the central computing device.

11. A personal safety system comprising:
at least one portable communication device communicatively connected to a wireless communication network;
a central computing device communicatively connected to the wireless communication network;
wherein the at least one portable communication device is configured to enable activation of an alarm condition by a user, and transmitting data on the activation of the alarm condition to the central computing device via the wireless communication network;
wherein the central computing device is configured to receive the data regarding the activation of the alarm condition from the at least one portable communication device via the wireless communication network;
wherein the central computing device is configured to activate the alarm condition at the expiration of a predetermined time delay after the activation of a first operating element on the communication device, wherein the portable communication device comprises a third operating element and/or a remote activation device in wireless communication with the portable communication device;

wherein the portable communication device is configured to transmit to the central communication device an instruction for immediate activation of the alarm condition in response to operation of the third operating element and/or the activation of the remote activation device; and wherein the central computing device is configured to cause immediate activation of the alarm condition in response to receipt of the instruction.

* * * * *